(12) United States Patent
Molaskey et al.

(10) Patent No.: US 7,271,915 B2
(45) Date of Patent: Sep. 18, 2007

(54) SYSTEM, CIRCUIT AND METHOD FOR OFF-MODE-PEAK OPERATION OF RING LASER GYROSCOPES

(75) Inventors: Clifford T. Molaskey, St. Petersburg, FL (US); Leroy O. Thielman, Shoreview, MN (US); Douglas A. Chamberlin, Trinity, FL (US)

(73) Assignee: Honeywell International Inc., Morristown, NJ (US)

( * ) Notice: Subject to any disclaimer, the term of this patent is extended or adjusted under 35 U.S.C. 154(b) by 274 days.

(21) Appl. No.: 11/051,950

(22) Filed: Feb. 4, 2005

(65) Prior Publication Data

US 2006/0176489 A1  Aug. 10, 2006

(51) Int. Cl.
*G01C 19/68* (2006.01)
(52) U.S. Cl. ..................................... 356/473
(58) Field of Classification Search ............... 356/459, 356/472, 473; 372/94
See application file for complete search history.

(56) References Cited

U.S. PATENT DOCUMENTS 4,113,387 A * 9/1978 Shutt .......................... 356/469
4,284,964 A * 8/1981 Maier, Jr. ..................... 356/473
4,561,780 A * 12/1985 Ljung et al. ................. 356/473
4,783,169 A * 11/1988 Matthews et al. ............ 356/473
5,074,664 A    12/1991 Mark et al.
5,208,653 A * 5/1993 Mark et al. .................. 356/467
5,335,063 A * 8/1994 Karpinski, Jr. .............. 356/473
6,618,151 B2  9/2003 Killpatrick et al.

FOREIGN PATENT DOCUMENTS

GB         2258560         2/1993

* cited by examiner

*Primary Examiner*—Samuel A. Turner
(74) *Attorney, Agent, or Firm*—Fogg & Powers LLC

(57) ABSTRACT

A system, circuit and method are disclosed for operating a Ring Laser Gyroscope (RLG) off-mode-peak to avoid exciting undesirable transverse modes. An alternate PLC operating point can be used to bias the optical path length of the RLG to an appropriate side of an ideal integer number of wavelengths, and thus avoid exciting the undesirable transverse modes. Although this alternate PLC operating point is not perfect with respect to establishing an integer number of wavelengths, this operation provides acceptable performance of the RLG's (in particular, short length path RLG's), and acceptable margin can be established relative to variations in the PLC set points involved.

20 Claims, 4 Drawing Sheets

SYSTEM, CIRCUIT AND METHOD FOR OFF-MODE-PEAK OPERATION OF RING LASER GYROSCOPES

GOVERNMENT LICENSE RIGHTS

The U.S. Government may have certain rights in the present invention as provided for by the terms of Contract No. DASG60-00-C-0072 awarded by the Department of Army.

BACKGROUND OF THE INVENTION

1. Technical Field

The invention relates generally to the field of gas tube-style laser gyroscopes, and more specifically, but not exclusively, to a system, circuit and method for off-mode-peak operation of Ring Laser Gyroscopes (RLG's) in order to avoid and/or mitigate transverse mode excitation.

2. Description of Related Art

RLG's are used as inertial sensors in guidance, navigation and attitude control applications. For example, RLG's can be used for spacecraft and aircraft guidance, navigation, and attitude control applications. In a typical inertial navigation system application, a pair of RLG's may be mounted on a platform inside a set of gimbals (or mounted in a more prevalent strap-down arrangement commonly used for smaller, lower performance RLG's). Sensors located on the gimbals can detect when the platform rotates. A set of three accelerometers can be attached to the platform to determine in what direction the aircraft or spacecraft is heading, and how the motion of the aircraft or spacecraft is changing in the three directions. Such navigational information can be used, for example, by an aircraft's autopilot to keep the aircraft on course, or by a spacecraft's guidance system to guide the spacecraft into a predetermined orbit.

Essentially, RLG's are used to measure angular rotation rates. For example, in a typical RLG, two laser beams are generated in opposite directions around a closed loop path about the axis of rotation of the RLG. Rotation of the RLG device changes the effective path length for the two beams. This rotation of the device thus produces a frequency difference between the two beams, because the frequency of oscillation of the beams depends on the length of the lasing path. This frequency difference between the beams results in a phase shift between the beams that changes at a rate proportional to the frequency difference. The interaction of the laser beams produces an interference fringe pattern, which moves with a velocity proportional to the rate of angular rotation of the RLG device about the axis. An example of such an RLG device is described in U.S. Pat. No. 6,618,151 to Killpatrick, et al, and Honeywell International Inc. as assignee. A primary advantage of this RLG is that it employs an offset aperture for attenuating undesired modes of laser propagation. Nevertheless, the attenuation of undesired modes of laser propagation is only one of the significant technical problems that exists in the design and manufacture of RLG's.

Another significant technical problem that exists in the design and manufacture of RLG's is in the field of relatively small path length RLG's. For example, an RLG device is typically constructed as a triangular or square glass block cavity filled with helium and neon gas, and integral mirrors at each corner with piezoelectric elements backing at least one mirror so as to allow optical path length adjustments by displacement of that mirror. The performance of such an RLG device is driven primarily by such characteristics as the optical apertures, fill gas elements, discharge current restraints, and path length control of the RLG's, which all play an important role in the establishment of coherent light propagation in the RLG's.

In relatively small path length RLG's, a critical design constraint is that an adequate amount of Path Length Control (PLC) is needed to ensure that an integer number of wavelengths are encountered within the traversed optical cavity. However, the use of smaller sensors in the shorter path length RLG's (e.g., GG1308 RLG's made by Honeywell Inc.) makes the PLC accuracy constraints very challenging. As such, failure to maintain the PLC of short path length RLG's can result in poor performance of the RLG's and, in some cases, a complete lack of operation.

Specifically, the conventional short path length RLG's operate at mode peak and use a Phase-Sensitive Synchronous Demodulator (PSSD) control approach to minimize noise. Essentially, the control loop for the RLG dithers about the mode's peak in an attempt to provide the requisite PSSD control. However, the modes (humps) observed in the short path length RLG's are not perfectly shaped. In other words, the short path length RLG's have design issues that can deviate significantly from those RLG's operating with a perfectly (or nearly perfectly) shaped hump. Consequently, if the PLC is dithering about the mode's peak in a conventional short path length RLG, any amount of additional noise experienced can cause the PLC to wander into an area (e.g., valley) with one or more undesirable transverse modes.

Therefore, it would be advantageous to have a solution to this existing problem of maintaining the PLC of short path length RLG's, which identifies a suitable PLC operating point that can allow relaxation of the relatively tight PLC requirements while maintaining optimum performance of the RLG's. As described in detail below, the present invention provides such a solution.

SUMMARY OF THE INVENTION

The present invention provides a system, circuit and method for operating an RLG off-mode-peak to avoid exciting undesirable transverse modes. An alternate PLC operating point can be used to bias the optical path length of the RLG to an appropriate side of an ideal integer number of wavelengths, and thus avoid exciting the undesirable transverse modes. Although this alternate PLC operating point is not perfect with respect to establishing an integer number of wavelengths, this operation provides acceptable performance of the RLG's (in particular, short length path RLG's), and acceptable margin can be established relative to variations in the PLC set points involved. In one example embodiment, a PLC loop can be used to dither about this operating point as a discriminate to allow closed loop control of the path length. Also, in this embodiment, a PSSD control architecture can be used to establish and maintain a requisite path length over relatively wide variations in operating temperature.

In accordance with a preferred embodiment of the present invention, a small offset error can be injected into a conventional PSSD loop for an RLG, which causes the loop to converge on a pre-selected operating point that is on one side of a conventional convergence point. The magnitude and polarity characteristics of this operating point offset can be determined for each RLG, or such characteristics can be consistently used for a family of RLG's based on, for example, a characterization of a Laser Intensity Monitor (LIM) versus the path length involved. A LIM is a photodiode output that reflects the optical energy within a laser cavity. Observing the nature of the LIM provides empirical, graphical information that can be used for plotting inflections that identify a PLC drive that would likely result in supporting the undesirable transverse mode waves. For this embodiment, the PSSD loop architecture used can null the loop to overcome error sources that are within the modulation and feedback paths. In this case, an offset injection signal can be applied at an integrator reference node of a PSSD. An Application-Specific Integrated Circuit (ASIC) can be used to implement most or all of the PSSD's stages. As such, a hook can be designed into such an ASIC that enables the offset injection by pinning out a non-inverting terminal for each integrator amplifier involved.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
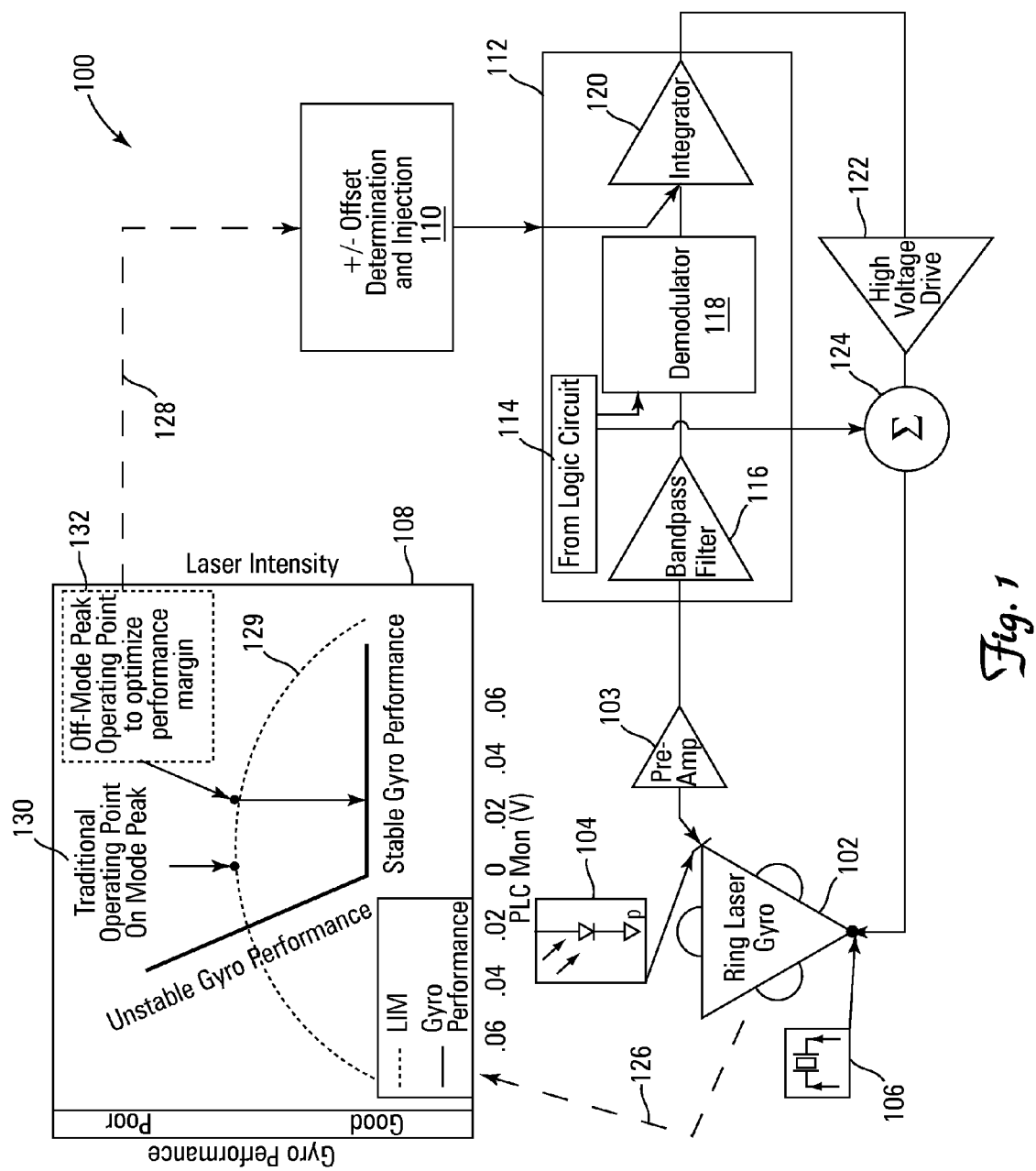
FIG. 1 depicts a block diagram of an example system for off-mode-peak operation of an RLG, which can be used to implement a preferred embodiment of the present invention.

With reference now to the figures, FIG. 1 depicts a block diagram of an example system for off-mode-peak operation of an RLG, which can be used to implement a preferred embodiment of the present invention. As shown, RLG control system 100 includes an RLG 102. For this example embodiment, RLG 102 is preferably a relatively short path length RLG. However, the present invention is not intended to be so limited and can include all sizes and/or structures that are suitable for an RLG, and the present invention can also include any suitable gas tube-style laser gyroscope. The performance of RLG 102 can be observed by coupling optical energy information from the cavity of RLG 102 (e.g., via a suitable optical energy coupler 126) to a LIM 108, which provides a photo-diode output that reflects the optical energy within the cavity of RLG 102. Thus, LIM 108 can be used to identify (e.g., graphically) plot inflections that, in turn, identify a PLC drive setup that should result in the support or excitation of undesirable transverse mode waveforms.

For example, LIM 108 shows an example LIM output 129 (e.g., in graph form) that can be used for determining a suitable operating point for RLG 102. As shown, LIM 108 can identify a traditional operating point 130 for RLG 102. For conventional PLC systems, the use of this On-Mode-Peak operating point 130 typically results in the excitation of undesirable transverse mode waveforms. On the other hand, in accordance with the present invention, LIM 108 can be used advantageously to identify a suitable Off-Mode-Peak operating point 132 that optimizes the performance margin of RLG 102 and avoids excitation of the undesirable transverse waveforms.

The Off-Mode-Peak operating point 132 is coupled via a signal coupling or connection 128 to an offset determination and injection circuit 110, which determines from the output of LIM 108, the magnitude and polarity of an offset signal to be injected at (or otherwise applied to) an input terminal of an integrator amplifier 120 of PSSD 112. For this example embodiment, the PSSD loop architecture nulls the loop to overcome error sources that are within the modulation and feedback paths. Consequently, for this embodiment, the offset injection is applied directly at a reference node of integrator amplifier 120. For example, a hook can be designed into an ASIC or other suitable IC, which enables the use of an offset injection approach by pinning out a non-inverting terminal for each integrator amplifier used. As such, PSSD 112 also includes a band-pass filter 116 coupled at its input to a pre-amplifier 103, which in turn, is connected to a signal output 104 from RLG 102. For example, the signal output 104 can be produced by a photo-diode and can represent optical energy in a cavity of RLG 102. An output of band-pass filter 116 is coupled to an input of a demodulator 118, and a second input to demodulator 118 is coupled to an output of a logic circuit 114. A second output of logic circuit 114 is connected to an input of a summer 124.

An output of demodulator 118 is coupled to a reference input of integrator 120. An output of integrator 120 is coupled to an input of a high voltage drive 122, and an output of high voltage drive 122 is coupled to a second input of summer 124. An output of summer 124 is coupled to a piezoelectric mirror drive 106 of RLG 102, which completes a PLC loop in the example RLG control system 100 shown in FIG. 1. Therefore, in accordance with the present invention, an offset error is injected into the PSSD loop shown in FIG. 1 that causes the loop to converge on an off-mode-peak operating point of the RLG and avoids excitation of undesirable transverse mode waveforms.

Figure 2:
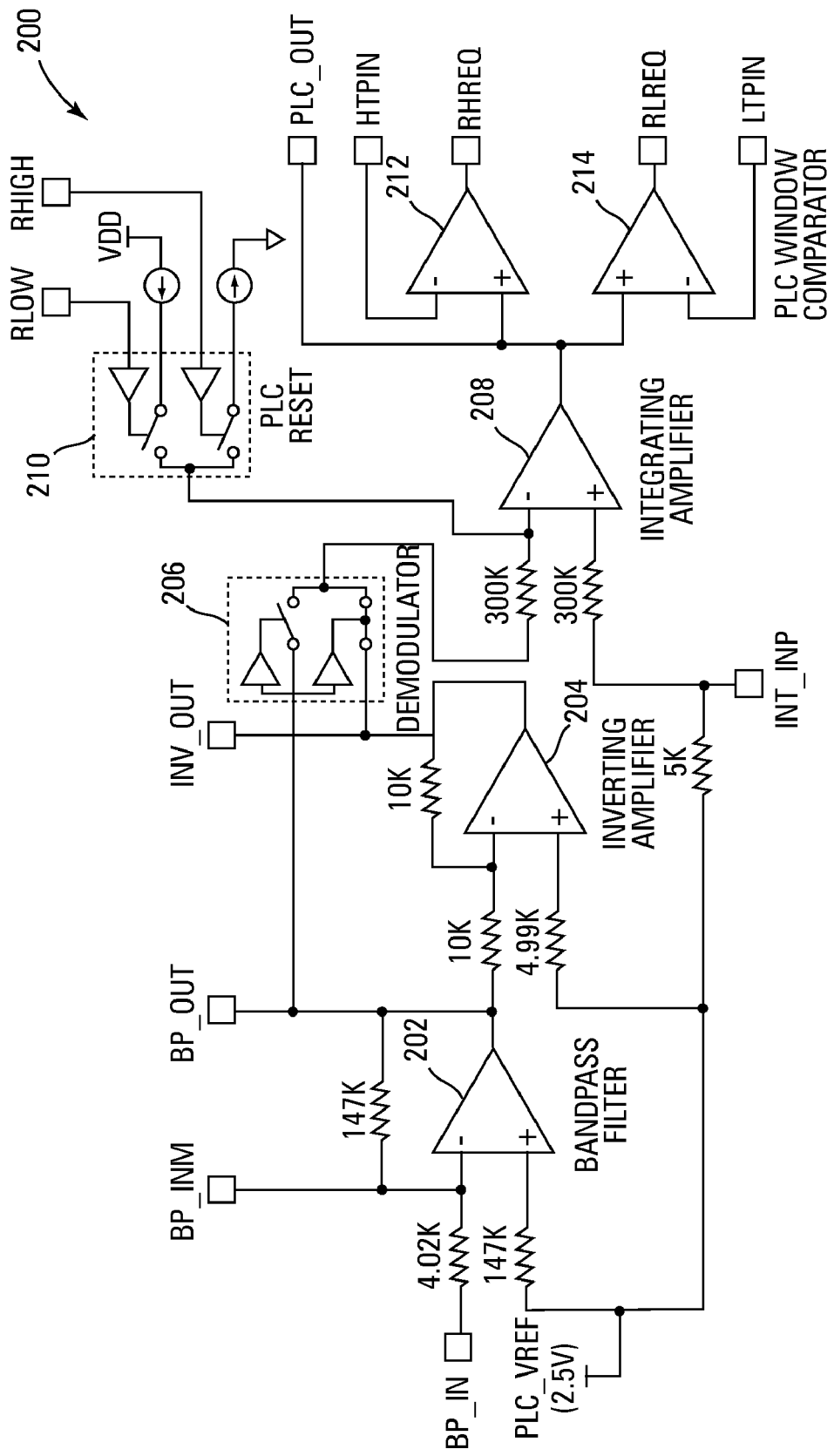
FIG. 2 depicts a block diagram of an example PSSD stage, which can be used to implement a PSSD shown in FIG. 1.

FIG. 2 depicts a block diagram of an example PSSD stage 200, which can be used to implement, for example, PSSD 112 shown in FIG. 1. For this example embodiment, PSSD stage 200 includes a band-pass filter 202. Band-pass filter 202 can be used to implement band-pass filter 116 in FIG. 1 for at least one channel (e.g., one channel of seven channels). For example, band-pass filter 202 can be implemented as a $2^{nd}$ order filter with a nominal center frequency of 4.8 KHz (e.g., if certain capacitance values are used for external capacitors). Another nominal center frequency for band-pass filter 202 may be, for example, 20 KHz. Notably, it should be understood that a relatively large range of modulation frequencies may be used. In this regard, the primary design considerations involve loop response time versus the stability margins and steady state error.

Returning to the above-described 4.8 KHz example, a nominal input impedance for band-pass filter 202 can be 4KΩ (e.g., absolute value of 4.0KΩ±30%), and a nominal feedback resistance for band-pass filter 202 can be 147KΩ (e.g., absolute value of 147KΩ±30%). Also, input terminal BP_IN coupled to an input of band-pass filter 202 can be AC coupled to a LIM_IN signal (e.g., reflecting optical energy in a cavity of RLG 102 in FIG. 1) via a readout preamplifier (e.g., via readout preamplifier 103 in FIG. 1) through a 0.01 μF capacitor. A nominal feedback capacitance can be 220 pF to obtain a center frequency of 4.8 KHz. In this example, the input capacitor and feedback capacitor can be external to the IC or ASIC involved. Also, for this example, the applied AC signal (e.g., applied at terminal BP_IN in FIG. 2) should not exceed 0.1V peak-to-peak.

For this example, PSSD stage 200 also includes an inverting amplifier 204. An input terminal of inverting amplifier 204 is coupled to an output of band-pass filter 202, and a second input terminal of inverting amplifier 204 is coupled to a PLC reference voltage (e.g., PLC_VREF of 2.5V). Notably, for this example embodiment, this PLC reference is implemented as a pseudo GND, which allows a 0 to 5V operation to appear bipolar to signals centered at 2.5V. However, if another implementation of such an inverting amplifier uses bipolar supplies, then this PLC reference can be GND (0V).

The PLC reference voltage can be used internally to the IC or ASIC involved, and also as an external source to other external circuits (e.g., high voltage drive 122 in FIG. 1). A primary function of inverting amplifier 204 is to invert the output of band-pass filter 202, in order to provide for a balance demodulator while requiring only one large integrating capacitor per channel. Notably, it should be understood that the present invention is not intended to be limited to just a balance demodulator implementation. For example, a four quadrant multiplier demodulation scheme may be used.

Returning to the above-described embodiment, a nominal gain of inverting amplifier 204 is 0 dB, with a 180° phase shift between the input and output of inverting amplifier 204 (e.g., nominal gain of −1V/V). An absolute value for the input resistor and feedback resistor of inverting amplifier 204 is 10KΩ±30%. An absolute value for the bias resistor of inverting amplifier 204 is 4.99KΩ±30%. The tracking between the input resistor and feedback resistor of inverting amplifier 204 is ±2%.

Also, for this example, PSSD stage 200 includes a plurality (e.g., 2) of demodulator switches 206. An input of one demodulator switch is coupled to an output of band-pass filter 202, and an input of a second demodulator switch is coupled to an output of inverting amplifier 204. As such, a primary function of the demodulator switches is to demodulate the PLC signal. A control signal, PLC_DMOD, is 90° phase-shifted with respect to the modulation signals, so that the phase shift around the PLC loop is nominally 0°. The 90° phase shift results from the integration of the modulation signals when applied to a piezoelectric transducer, which functions electrically as a capacitor.

Additionally, PSSD stage 200 includes an integrating amplifier 208 and PLC reset circuit 210. The PLC reset function allows realignment of the loop operating point to an integer number of wavelengths in the cavity of RLG 102 (FIG. 1), when the piezoelectric mirror drive 106 authority has reached a limit. An input of integrating amplifier 208 is coupled to an output of demodulator switches 206 and an output of PLC reset circuit 210. As such, a primary function of integrating amplifier 208 is to provide a tuning signal for a driver amplifier of the PLC (e.g., high voltage drive 122 in FIG. 1). The integrator's time constant can be formed by an external feedback capacitor and the nominal 300KΩ input resistors for integrating amplifier 208. PLC reset can be performed by either injecting into, or pulling a current from, the inverting input of integrating amplifier 208. The RHIGH and RLOW control signals coupled to PLC reset circuit 210 determine in which direction the PLC_OUT signal from integrating amplifier 208 is driven, by selecting either polarity of an adjustable current source. The magnitude of the output of this adjustable current source can be varied by placing a resistor between an RST_SEL (e.g., reset bias resistor) pin and ground. A relationship between the current and resistor is shown by the following equation:

$$\left[\frac{1.2\,\text{V}}{R} \times \frac{10}{12} + 10\mu A\right] \times 5 = PLC \text{ Reset Current into Integrator} \quad (1)$$

where 1.2V/R is the reference current from an adjustable PLC bias generator, 10/12 is the current gain in the adjustable PLC bias generator, 10 µA is the current from the main bias generator, 5 is the current gain in the PLC reset circuit (e.g., 210), and R is the value of the resistor between RST_SEL and ground. As such, an absolute value for RSUM and RBIAS (e.g., input resistors for integrating amplifier 208) is 300KΩ±50%. A matching tolerance for RSUM and RBIAS is ≦2% of the absolute value. An absolute tolerance for RST_SEL tied to VDD is 50 µA±6%, and an absolute tolerance for the reset current (e.g., RST_SEL tied via resistor to GND) is 50-100 µA±6%.

Furthermore, PSSD stage 200 includes a plurality (e.g., two) of PLC window comparators 212 and 214. An input of each PLC window comparator 212 and 214 is coupled to an output of integrating amplifier 208. As such, a primary function of each PLC window comparator 212, 214 is to determine whether or not the PLC output voltage is within the range of 1.8V to 3.9V (e.g., assuming that a nominal internal reference is utilized). This information from a PLC window comparator is used as part of a reset mechanism for PLC resets. The RHREQ (Reset Request High output) signal from PLC window comparator 212, and the RLREQ (Reset Request Low output) signal from PLC window comparator 214, is used as an indication of the PLC output voltage reaching either the upper or lower end of the tuning range. These PLC window comparator outputs can trip (assert) RHREQ and RLREQ at the voltage levels of terminals HTPIN (High Trip Point voltage input) and LTPIN (Low Trip Point voltage input), respectively. Built-in hysteresis can operate as follows: RHREQ is negated when PLC_OUT equals HTPIN minus hysteresis (e.g., 360 mV$_{nom}$), and RLREQ is negated when PLC_OUT equals LTPIN plus hysteresis (e.g., 360 mV$_{nom}$). For example, a typical application can utilize internally generated references by externally connecting HTPREF (High Trip Point voltage reference output) to HTPIN and LTPREF (Low Trip Point voltage reference output) to LTPIN. The LTPREF and HTPREF voltages are used as precision trip point voltages for the PLC window comparators 212, 214. The LTPREF and HTPREF voltages are a nominal 1.8V and 3.9V for the low and high trip points, respectively. Additionally, an alternative Reset determination may be used, including, for example, an A-to-D conversion of the output of integrator 208, which allows process determination of the Reset Threshold that considers environments (e.g., temperature) and other Reset driving stimuli.

Figure 3:
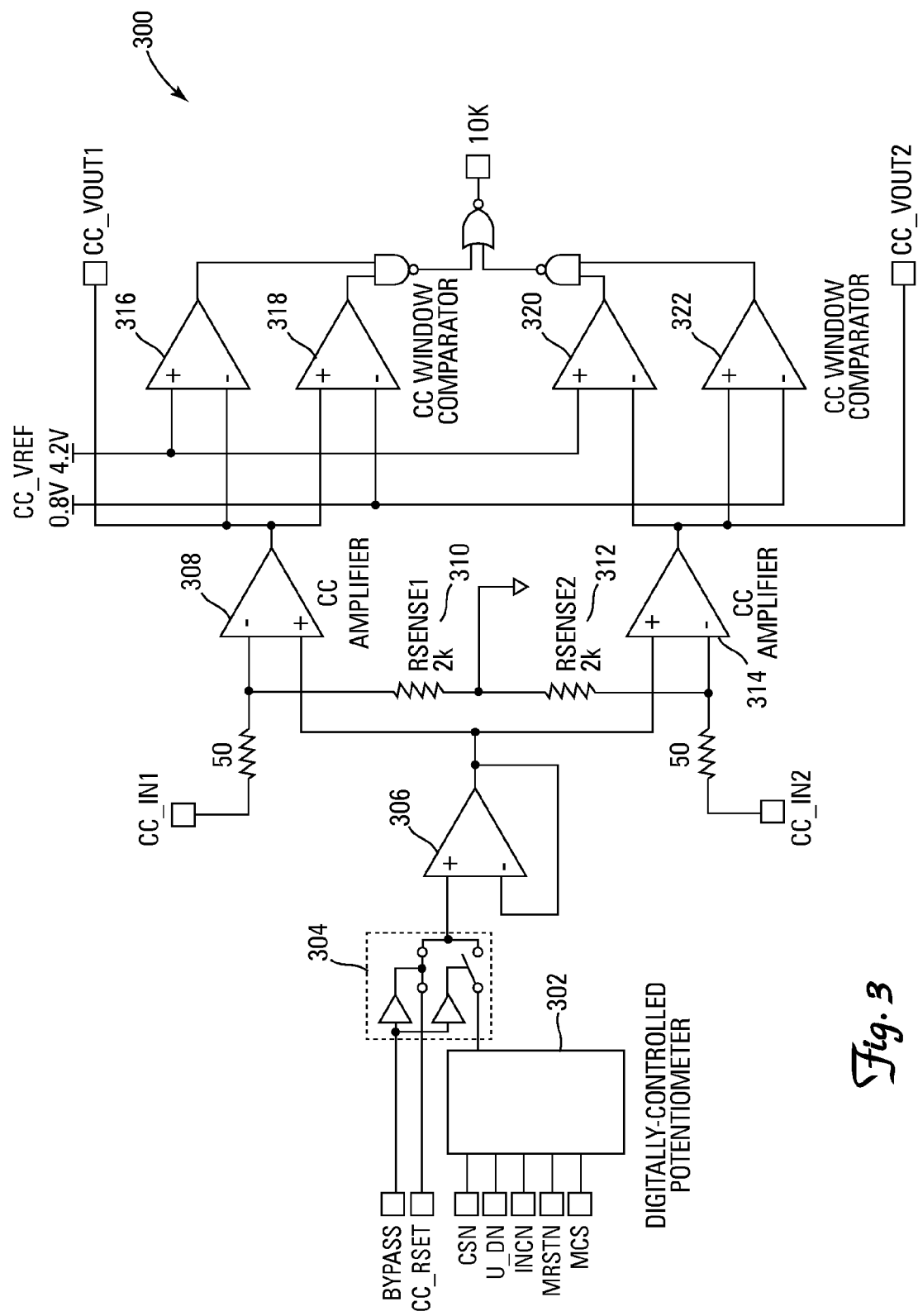
FIG. 3 depicts a block diagram of an example current control stage, which can be used to implement current control for a PSSD shown in FIG. 1.

FIG. 3 depicts a block diagram of an example current control stage 300, which can be used to implement, for example, current control for RLG 102 shown in FIG. 1. For this example embodiment, current control stage 300 includes a plurality (e.g., 2) of current control amplifiers 308 and 314 and sense resistors 310 and 312. A primary function of current control amplifiers 308, 314 and sense resistors 310, 312 is to precisely control the run current in two legs of an RLG (e.g., RLG 102 in FIG. 1). For example, the run current control range can be from 400 µA to 1.1 mA total for the combination of the two legs of the RLG. The current control amplifiers 308, 314 can be connected with an N-channel MOSFET in each of their feedback loops. The outputs of the current control amplifiers 308, 314 (e.g., CC_VOUT1 and CC_VOUT2) can be connected to the gates of the MOSFET's used in the feedback loops. The RLG run current can be sensed by the matched pair of 2KΩ sense resistors 310, 312 connected between the negative inputs of current control amplifiers 308, 314, the input terminals CC_IN1 and CC_IN2, and analog ground. As such, an absolute value for each of sense resistors 310 and 312 can be 2KΩ±30%, an absolute value for the input resistor(s) can be 100Ω to 400Ω, and the tracking between sense resistors 310 and 312 can be ≦±0.1%. For the implementation shown, it is important to note that the input resistors are included to address certain frailties of particular ASIC Input/Output structures needed to create the high tolerance sense resistors shown. However, the present invention is not intended to be limited by such an implementation scheme, and such input resistors may not be included in other implementations.

Current control stage 300 also includes a current control reference voltage source and selection unit 304, which functions primarily to provide a stable precision voltage reference for current control amplifiers 308, 314. For this example embodiment, there are two control modes for the reference voltage, CC_VREF. The first mode applies a precision voltage to the CC_RSET pin. The RLG run current can be calculated by dividing the voltage applied to the CC_RSET pin by 1KΩ. The BYPASS pin is held in the active high (logic "1") to enable this mode. When the BYPASS pin is held in the inactive low (logic "0"), the output reference voltage from a digitally-controlled potentiometer 302 is applied to the current control amplifier circuitry. Digitally-controlled potentiometer 302 allows wiper adjustments of 64 equal segments with the ability to control the run current of the RLG from 400 μA to 1.1 mA. This control range equates to approximately 11 μA per segment. An operational amplifier 306 is used as a buffer stage to isolate the reference voltage generation sections from the current control amplifier circuitry. A plurality of FET's and an inverter are used to determine a reference voltage selection mode.

For this example embodiment, digitally-controlled potentiometer 302 functions as a three-terminal device. The device is constructed of 63 resistive elements and a wiper control network that creates 64 accessible tap points including two end terminals. The third terminal, or wiper, is used to access each of the 64 taps and is controlled by a signal at terminal CSN, U_DN, and INCN. The negative edge transition of the signal at terminal INCN may increment or decrement the counter depending on the state of the signal at the U_DN terminal. The output of the counter, once decoded, determines a position along the 64 taps that the wiper will move to. The counter does not wrap around when it reaches the end of the tap array and so, the wiper does not move beyond the last position at either extreme. The potential of the specific point is then transferred to the wiper by an electronic switch (e.g., switches 304). When appropriately deselected, the position of the wiper can be stored in non-volatile memory and retrieved, when the device is powered back up. The Master Chip Select (MCS) pin and Master Reset (MRSTN) pin can be used to protect the device from an inadvertent adjustment. The MCS is enabled in order for any adjustments in the potentiometer to take place, and the MRSTN pin clears all state machine logic upon power up.

For this example, the CC_RES input voltage range is 200 mV to 2V, the voltage tuning range is 400 mV to 1.1V, the operational amplifier offset voltage is <5 mV, the potentiometer resolution is 12 mV±5%, and the output voltage stability is ±2% max. The BYPASS pin is used to select an external reference or digitally-controlled potentiometer 302 (e.g., logic 1=External CC_REF source). The U_DN pin is used for up/down selection (common), the INCN pin is used for incrementing (common), and CSN represents an individual channel chip selector (e.g., out of three channels).

Additionally, current control stage 300 also includes a current control window comparator with a plurality (e.g., 4) of current control window comparator units 316, 318, 320 and 322. For this example embodiment, an input of each control current window comparator unit is coupled to an output of one of current control amplifiers 308 or 314. A second input of current control window comparators 316, 318, 320 and 322 is coupled to a CC_VREF (e.g., current control voltage reference) terminal. The current control window comparator reference voltages (e.g., CC_VREF) are used as trip point voltages for the current control window comparators 316, 318, 320 and 322. The low trip limit voltage and high trip limit voltage are 0.8 VDC and 4.2 VDC for the low and high trip limits, respectively.

A primary function of the current control window comparator unit is to monitor the voltage at the gate of the high voltage MOSFET to ensure that the current through the MOSFET's is within a required control range. The output of the current control window comparators 316, 318, 320 and 322, or IOK (e.g., current control "OK" signal), provide a single BIT monitor per RLG.

Figure 4:
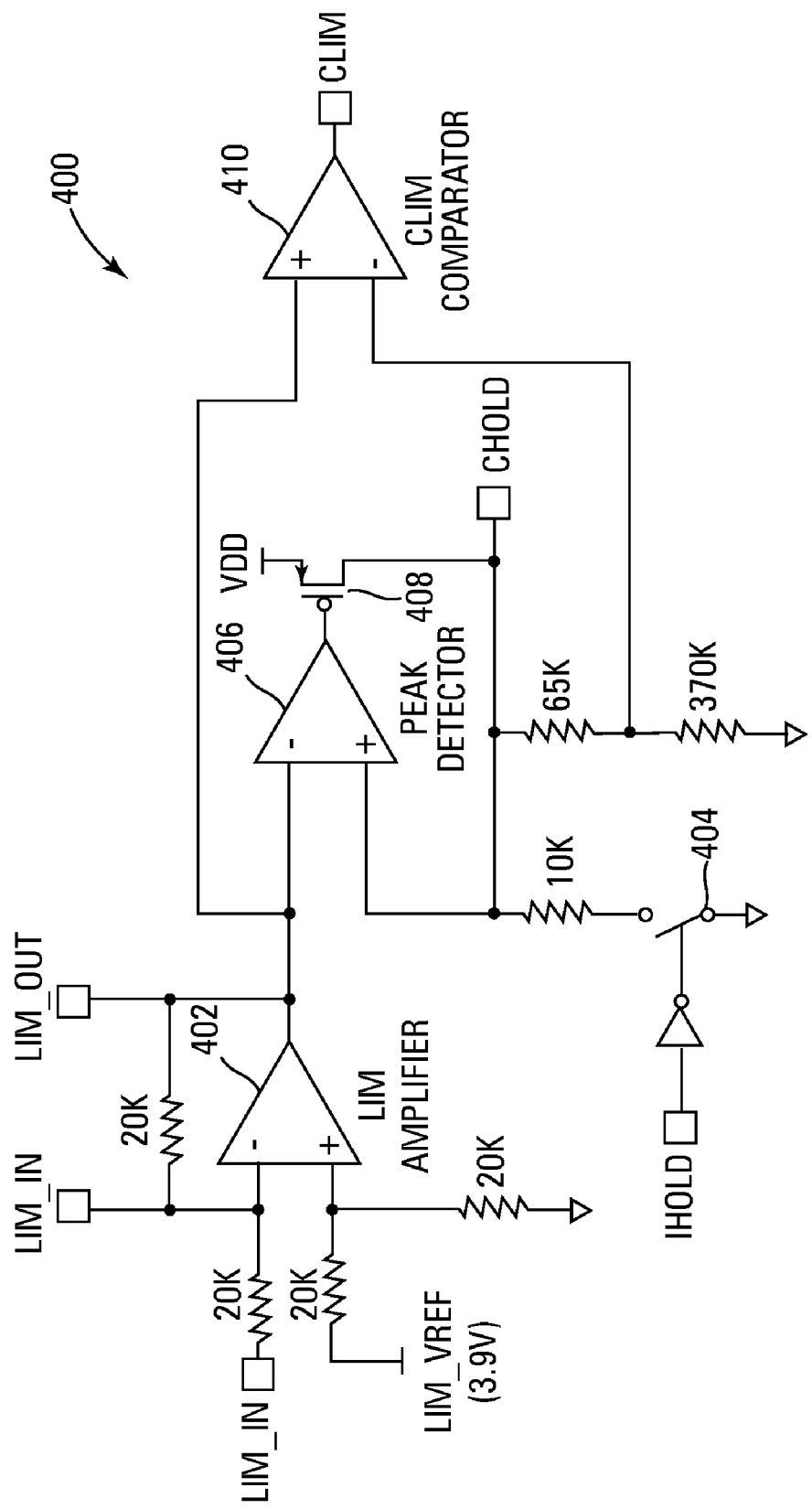
FIG. 4 depicts a block diagram of an example LIM stage, which can be used to implement a LIM for a PSSD shown in FIG. 1.

FIG. 4 depicts a block diagram of an example LIM stage 400, which can be used to implement, for example, LIM 108 for PSSD 112 shown in FIG. 1. For this example embodiment, LIM stage 400 includes a LIM amplifier 402. A primary function of LIM amplifier 402 is to provide amplification and filtering of the PLCIN signal. LIM amplifier 402 has a nominal gain of 1, and a nominal −3 dB roll-off at 24 KHz. A 330 pF capacitor can be connected external to the PLC/CC IC (or ASIC) and used to set the pole frequency of the filter. An absolute value for the three input resistors and feedback resistor is 20KΩ±30%. Tracking between the three input resistors and feedback resistor is ±2%. The LIM reference voltage (e.g., LIM_VREF) is a standard 3.9 VDC for use internally to the IC or ASIC involved, and also as an external source to other external circuits (e.g., LIM preamplifier 103 in FIG. 1).

LIM stage 400 also includes a peak detector 406. For this example embodiment, an input of peak detector 406 is coupled to an output of LIM amplifier 402, and a second input of peak detector 406 is coupled to an IHOLD terminal via a switch 404. A primary function of peak detector 406 is to detect the peak and level shifting of the PLCIN signal used to monitor the LIM voltage. Peak detector 406 also drives current into a hold capacitor. The CHOLD capacitor is discharged through a 435KΩ resistor (370KΩ plus 65KΩ) during normal operation, and through a 10KΩ resistor during start up. Peak detector 406 stores the DC value of the fundamental mode peak, which is used as a reference for the PLC reset circuitry to ensure that the fundamental mode is acquired. The IHOLD switch (e.g., 404) and buffer allow the discharge time constant of the peak detector hold capacitor, CHOLD, to be reduced during power up. An active low (logic 0) signal on the IHOLD pin causes the value of the discharge resistor to change from 435KΩ to 10KΩ. This operation ensures that the transient current spikes through the laser block assembly during start up will not overcharge the peak detector capacitor.

LIM stage 400 also includes a CLIM comparator 410. For this example embodiment, an input of CLIM comparator 410 is coupled to an output of LIM amplifier 402. As such, a primary function of CLIM comparator 410 is to compare the signal level stored in the peak detector with the existing mode voltage from the LIM amplifier/filter 402 and provide an indication if the existing mode voltage is <85% of the signal level stored in the peak detector.

It is important to note that while the present invention has been described in the context of a fully functioning system, circuit and/or method for off-mode-peak operation of an RLG, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for off-mode-peak operation of a gas tube-style laser gyroscope, comprising:
   a laser gyroscope;
   a laser intensity monitor, an input of said laser intensity monitor coupled to at least one optical cavity of said laser gyroscope;
   an offset error injector, an input of said offset error injector coupled to an output of said laser intensity monitor;
   a phase-sensitive synchronous demodulator, said phase-sensitive synchronous demodulator including a demodulator stage and an integrating amplifier stage, an input of said demodulator stage coupled to an output of said laser gyroscope, an output of said demodulator stage coupled to a first input of said integrating amplifier stage, and an output of said offset error injector coupled to a second input of said integrating amplifier stage; and
   a voltage drive stage, an output of said integrating amplifier stage coupled to an input of said voltage drive stage, and an output of said voltage drive stage coupled to a drive input of said laser gyroscope, said offset error injector operable to:
   determine an offset error for an off-mode-peak operation of said laser gyroscope; and
   inject said offset error into said second input of said integrating amplifier stage so as to drive said drive input of said laser gyroscope to an off-mode-peak operating point of said laser gyroscope.

2. The system of claim 1, wherein said laser gyroscope comprises a ring laser gyroscope.

3. The system of claim 1, wherein said second input of said integrating amplifier stage comprises a reference node.

4. The system of claim 1, wherein said laser intensity monitor produces an output signal from a photo-diode that represents a magnitude and polarity of optical energy within said at least one optical cavity of said laser gyroscope.

5. The system of claim 1, further comprising:
   a preamplifier stage, said preamplifier stage coupled between said input of said demodulator stage and said output of said laser gyroscope; and
   a summer stage, said summer stage coupled between said output of said voltage drive stage and said drive input of said laser gyroscope.

6. The system of claim 1, wherein said phase-sensitive synchronous demodulator further comprises:
   a band-pass filter, said band-pass filter coupled between said output of said laser gyroscope and said input of said demodulator stage.

7. The system of claim 1, wherein the system components are arranged on an application specific integrated circuit.

8. A circuit for operating a ring laser gyroscope off-mode-peak, comprising:
   a band-pass filter, an input of said band-pass filter coupled to an output of said ring laser gyroscope;
   an inverting amplifier, an input of said inverting amplifier coupled to an output of said band-pass filter;
   a demodulator, a first input of said demodulator coupled to an output of said band-pass filter, and a second input of said demodulator coupled to an output of said inverting amplifier;
   an integrating amplifier, an input of said integrating amplifier coupled to an output of said demodulator;
   a path length control reset stage, an output of said path length control reset stage coupled to said input of said integrating amplifier; and
   at least one path length control window comparator stage, an output of said integrating amplifier coupled to an input of said at least one path length control window comparator stage, and an output of said at least one path length control window comparator stage including a signal indicating an operating point of said ring laser gyroscope.

9. The circuit of claim 8, further comprising:
   a digitally-controlled potentiometer, a control signal coupled to an input of said digitally-controlled potentiometer, said control signal operable to control a level of a reference voltage at an output of said digitally-controlled potentiometer;
   at least one current control amplifier, said at least one current control amplifier coupled to said output of said digitally-controlled potentiometer, and a first output of said at least one current control amplifier coupled to a run current input of said ring laser gyroscope; and
   a plurality of current control window comparators, a second output of said at least one current control amplifier coupled to at least one current control window comparator of said plurality of current control window comparators, an output of said at least one current control window comparator including a signal indicating a level of run current for said ring laser gyroscope.

10. The circuit of claim 8, further comprising:
    a laser intensity monitor amplifier, an input of said laser intensity monitor amplifier coupled to an output of said ring laser gyroscope;

a peak detector, an input of said peak detector coupled to an output of said laser intensity monitor amplifier; and a current laser intensity monitor comparator, a first input of said current laser intensity monitor comparator coupled to an output of said laser intensity monitor amplifier, a second input of said current laser intensity monitor comparator coupled to an output of said peak detector, and an output of said current laser intensity monitor comparator including a signal indicating a comparison of a signal level output from said peak detector with a mode voltage level output from said laser intensity monitor amplifier.

11. A method for off-mode-peak operation of a gas tube-style laser gyroscope, the method comprising the steps of:

coupling an input of a laser intensity monitor to at least one optical cavity of a laser gyroscope;

coupling an input of an offset error injector to an output of said laser intensity monitor;

coupling a signal from an output of said laser gyroscope to an input of a demodulator;

producing a demodulated signal;

coupling said demodulated signal to a first input of an integrating amplifier;

coupling an output of said offset error injector to a second input of said integrating amplifier;

coupling an output of said integrating amplifier to an input of a voltage drive stage;

coupling an output of said voltage drive stage to a drive input of said laser gyroscope;

determining an offset error for an off-mode-peak operation of said laser gyroscope;

injecting said offset error into said second input of said integrating amplifier;

producing an integrated offset error signal;

coupling said integrated offset error signal to said input of said voltage drive stage;

amplifying said integrated offset error signal; and driving said laser gyroscope with said integrated offset error signal to an off-mode-peak operating point of said laser gyroscope.

12. The method of claim 11, wherein said laser gyroscope comprises a ring laser gyroscope.

13. The method of claim 11, wherein the injecting step comprises the step of injecting said offset error into a reference node of said integrating amplifier.

14. The method of claim 11, wherein the step of coupling said laser intensity monitor comprises the step of producing an output signal from a photo-diode that represents a magnitude and polarity of optical energy within said at least one optical cavity of said laser gyroscope.

15. The method of claim 11, farther comprising the step of:

coupling a preamplifier stage between said input of said demodulator and said output of said laser gyroscope.

16. The method of claim 11, wherein the step of coupling said signal from said output of said laser gyroscope to said input of said demodulator further comprises the step of:

band-pass filtering said signal.

17. The method of claim 11, further comprising the steps of:

coupling a control signal to an input of a digitally-controlled potentiometer, said control signal controlling a level of a reference voltage at an output of said digitally-controlled potentiometer;

coupling an input of at least one current control amplifier to said output of said digitally-controlled potentiometer;

coupling a first output of said at least one current control amplifier to a run current input of said laser gyroscope; and coupling a second output of said at least one current control amplifier to at least one current control window comparator of a plurality of current control window comparators, an output of said at least one current control window comparator including a signal indicating a level of run current for said laser gyroscope.

18. The method of claim 11, further comprising the steps of:

amplifying said signal from said output of said laser gyroscope;

producing a mode voltage level signal;

detecting a peak level of the amplified signal;

comparing the mode voltage level signal with the detected peak level signal; and outputting a comparison signal indicating a result of the comparing step.

19. The method of claim 11, wherein the steps are performed in an integrated circuit.

20. The method of claim 11, wherein the steps are performed in an application specific integrated circuit.

* * * * *